United States Patent
Edwin et al.

(10) Patent No.: US 9,524,540 B2
(45) Date of Patent: Dec. 20, 2016

(54) TECHNIQUES FOR AUTOMATICALLY CORRECTING GROUPS OF IMAGES

(71) Applicant: Adobe Systems Incorporated, San Jose, CA (US)

(72) Inventors: Anand Samuel Edwin, Karnataka (IN); Komal Kumar Desai, Uttar Pradesh (IN)

(73) Assignee: Adobe Systems Incorporated, San Jose, CA (US)

(*) Notice: Subject to any disclaimer, the term of this patent is extended or adjusted under 35 U.S.C. 154(b) by 147 days.

(21) Appl. No.: 14/337,518

(22) Filed: Jul. 22, 2014

(65) Prior Publication Data

US 2016/0027151 A1   Jan. 28, 2016

(51) Int. Cl.
| | |
|---|---|
| *G06K 9/62* | (2006.01) |
| *G06T 5/00* | (2006.01) |
| *G06K 9/46* | (2006.01) |
| *G06F 17/30* | (2006.01) |

(52) U.S. Cl.
CPC .......... *G06T 5/00* (2013.01); *G06F 17/30247* (2013.01); *G06K 9/46* (2013.01); *G06K 9/6202* (2013.01); *G06K 2009/4666* (2013.01)

(58) Field of Classification Search
None
See application file for complete search history.

(56) References Cited

U.S. PATENT DOCUMENTS

| | | | | |
|---|---|---|---|---|
| 6,160,923 | A | * | 12/2000 | Lawton ............... G06T 5/20 382/260 |
| 2015/0110407 | A1 | * | 4/2015 | Sinha ............... G06K 9/6267 382/225 |

* cited by examiner

*Primary Examiner* — Stephen R Koziol
*Assistant Examiner* — Delomia L Gilliard
(74) *Attorney, Agent, or Firm* — Kilpatrick Townsend & Stockton LLP

(57) ABSTRACT

Disclosed are various embodiments for a computing device that receives input, from a user, selecting an area of a displayed image, where the area includes the blemish sought to be corrected by the user. The computing device identifies a spot pattern of the blemish to be corrected within the area and a context pattern of the displayed image. The computing device corrects the spot pattern of the blemish within the displayed image. The computing device identifies related images that have context patterns similar to the context pattern of the displayed image. The computing device automatically corrects similar instances of the spot pattern appearing within the related images.

20 Claims, 10 Drawing Sheets

TECHNIQUES FOR AUTOMATICALLY CORRECTING GROUPS OF IMAGES

BACKGROUND

Consumer image editing is on the rise with the advent of smartphones and tablets. People can capture photos or other images quickly and store them in remote "cloud" computing devices for access across various devices. Since consumers often capture photos on the go using their smartphones or other types of image capturing devices, the photos are not as professional looking as consumers would like, especially for photos to be shared or preserved for the future. Even though capturing moments "as it happens" is the essence of consumer photography, image editing is often required in order to produce beautiful photographic moments.

Consumers are not professional photo editors, and it can be intimidating for consumers to use professional image editing tools to correct the blemishes in the images. Moreover, using image editing tools is generally manual in nature and can be time-consuming to complete editing for just one photo. Given the nature of consumer photography, there are typically a large number of photos taken during an event or time period. During that time, if a blemish is present in one photo, it will often be present in many or all of the photos taken at that time. Manually editing each of the photos individually to correct the blemish can be tedious and time-consuming.

SUMMARY

Various aspects of the present invention relate to automatically correcting a blemish in a collection of images. In one implementation, a user provides input to a computing device selecting an area of a displayed image that includes the blemish sought to be corrected by the user. The computing device identifies a spot pattern of the blemish to be corrected within the area and a context pattern of the displayed image. The spot pattern identified by the computing device is editable by the user. The context pattern may be a multilevel context pattern comprising a plurality of component context patterns. The computing device corrects the spot pattern of the blemish within the displayed image, and the user confirms the correction.

The computing device identifies a collection of related images from the image library that have context patterns similar to the context pattern of the displayed image. Based at least in part upon on the confirmation of the correction in the displayed image and any edits to the spot pattern by the user, the computing device automatically corrects similar instances of the spot pattern appearing within the collection of related images. Correcting instances of the spot pattern appearing within the related images may be performed after the user confirms a preview of said correcting in the collection of related images.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
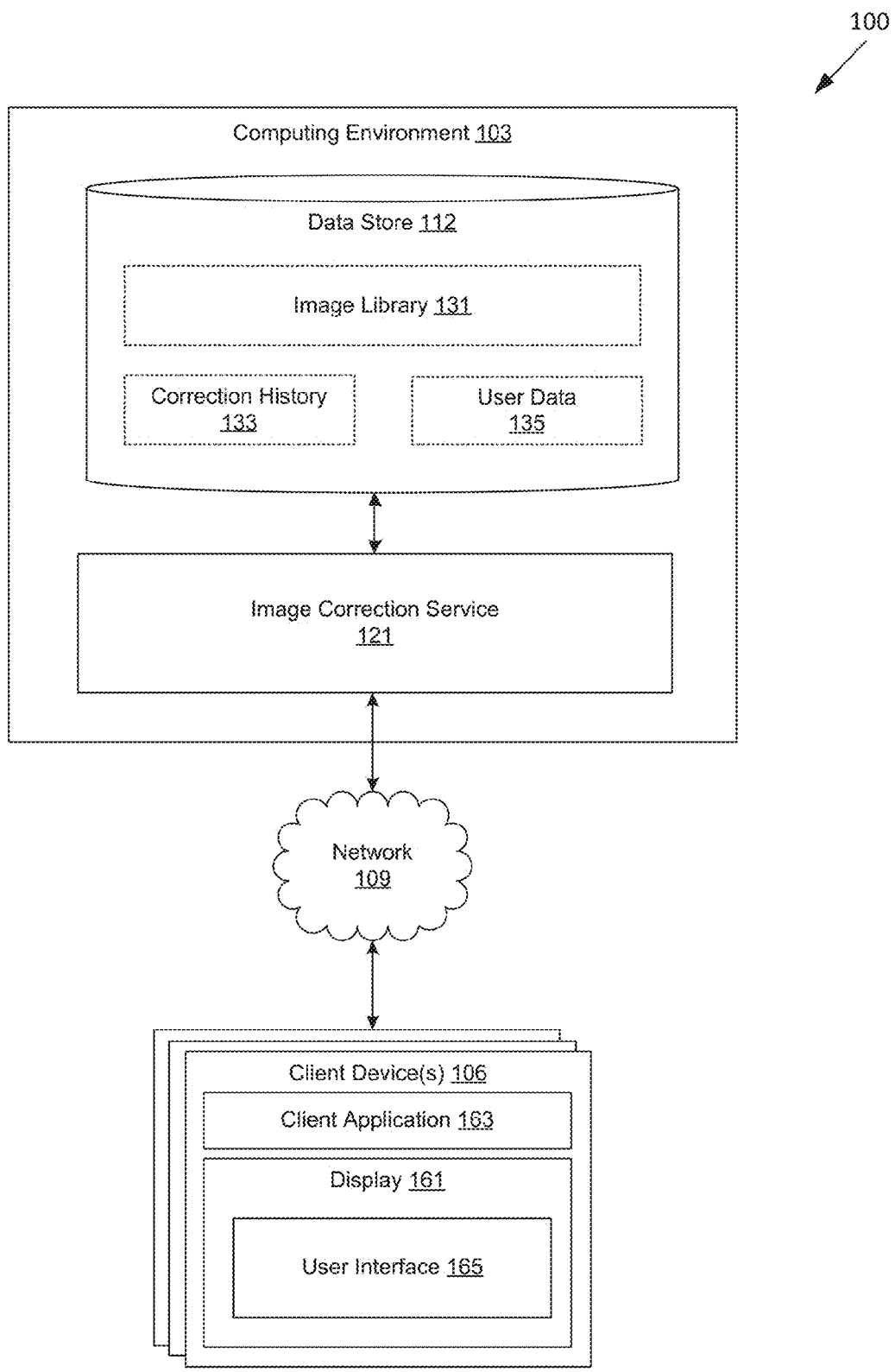
FIG. 1 is a drawing of a networked environment according to various embodiments of the present disclosure.

Disclosed herein are various embodiments relating to automatically correcting a blemish in a collection of images. A user selects an area of a displayed image that contains a blemish which the user seeks to remove. The selected area acts as a "hint" from which the blemish in the displayed image and similar blemishes in other images can be automatically corrected. Various user actions such as confirmations of the corrections and any changes to the corrections are analyzed in order to improve future corrections, resulting in fewer interventions and changes to the corrections by the user. In the following discussion, a general description of the system and its components is provided, followed by a discussion of the operation of the same.

As used herein, a "blemish" is a mark or similar flaw that a user perceives to impair the appearance of an image. For example, within a photographic image of a monument, a user may consider birds that are shown in flight around the monument to be a blemish. However, in other examples, birds in flight may be the intended subject of the image and, thus, not considered a blemish. As disclosed herein, a blemish may be distinguished from the desired image content based at least in part upon input from a user identifying an area of an image that contains the blemish. Similar blemishes present in other images are determined based on the similarity to the blemish previously identified by the user, as well as the similarity of the context in which the blemish appears. Returning to the examples using birds, images where birds in flight near a particular monument are a blemish can be distinguished from other images of birds as the intended subject using the context of the image, namely the presence of the particular monument as context. Other examples of blemishes may include a red-wine stain on a shirt, litter on the ground, a tattoo on an arm, etc.

As used herein, a "spot pattern" is the portion of the image representing a blemish that is sought to be corrected in the image. A user may initially identify an area of an image that contains a blemish. Within this area, the portion of the image representing the blemish (i.e. the spot pattern) is automatically detected using the techniques disclosed herein. In some embodiments, the spot pattern may be adjusted by the user in the event the automatically detected spot pattern does not precisely capture the blemish. The techniques for identifying similar blemishes in other images is carried out, at least in part, by comparing spot patterns of the blemishes. For example, in an image of a group of people, the face of one of the people may contain a scar that is considered to be a blemish. The pixels or other portion of the image representing the scar (i.e. the blemish) make up the spot pattern of the image. As another example, a landscape captured in an image may be littered with debris such as papers, bottles, cans, etc. The individual pieces of debris captured in the image may each be represented by a spot pattern made up of the corresponding pixels of the image.

As used herein, a "context pattern" is a region of the image that is surrounding, around, or near the blemish and thus provides information about the context in which the blemish occurs in the image. For example, in the image of the group of people discussed above, the region of the image representing the face of the particular person containing the scar may be the context pattern. In some instances, the context pattern may be a multilevel context pattern that includes various "component" context patterns. Each of the component context patterns of a given multilevel context pattern are different regions from the image that each contain all or a portion of the spot pattern. For example, in the image captured of a monument along with birds in flight discussed above, the component context patterns for the image may include a full shot of the monument that also includes all of the birds in the image, a cropped subsection of the image that includes all of the birds along with any portions of the monument within the subsection, a different cropped subsection of the image that includes one or more of the birds along with some portion of the monument within the subsection, etc.

Disclosed herein are various embodiments relating to automatically correcting a blemish in a collection of images. In an exemplary embodiment, a user selects an area of a displayed image that contains a blemish which the user seeks to remove. The selected area acts as a hint from which a spot pattern representing the blemish can be automatically detected. In addition, a context pattern representing a context in which the blemish occurs in the image is identified. The user is presented with a preview of the image that includes an automatic correction applied to the spot pattern. If the user approves the automatic correction, the corrected image is stored. Alternatively, the user may adjust the spot pattern and/or correction applied to the blemish (i.e. spot pattern) in the event the previewed correction is not satisfactory. The spot pattern, context pattern, and any changes made by the user are stored in a correction history.

Thereafter, other images are examined in order to identify similar spot patterns appearing within similar context patterns. The user is presented with a preview of the other images that include an automatic correction applied to the similar spot patterns identified in the other images. For each of the automatic corrections approved by the user, the corresponding corrected image is stored. For each of the automatic corrections rejected by the user, the user can reject making any correction, or the user can adjust the spot pattern and/or correction of the blemish in the event the previewed correction is not satisfactory. The spot patterns and context patterns of the other images, approvals and rejections of corrections, and any changes made by the user are stored in a correction history. The correction history is used to adapt the identification of similar blemishes in other images and the corrections to be applied to the images, thereby allowing the automatic correction operations to learn from previous activities based on approvals, rejections, and changes by the user.

With reference to FIG. 1, shown is an illustrative networked environment 100 according to various embodiments. The networked environment 100 includes a computing environment 103 and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. Although the functionality described herein is shown in the context of the networked environment 100, other implementations are possible, such as implementing the functionality in a single computing device (e.g. desktop computer or mobile device), as a plug-in or auxiliary feature of another service executed in a computing device, and/or in arrangements of computing devices other than those shown in FIG. 1.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include an image correction service 121 and other applications, services, processes, systems, engines, or functionality not discussed in detail herein. The image correction service 121 is executed to automatically correct a particular blemish present in a group of images based in part upon a user identifying the blemish to be removed in one image and potentially other image correction history.

The data stored in the data store 112 includes, for example, image library 131, correction history 133, user data 135, and potentially other data. The image library 131 includes images associated with various users of the image correction service 121, metadata associated with the images, etc. The images can be stored in various formats such as joint photographic experts group (JPEG), graphics interchange format (GIF), bitmap, raw, tagged image file format (TIFF), and/or other image formats as can be appreciated. The metadata for an image may include an identifier for the image capture device used, capture settings used (e.g. flash, shutter speed, etc.), geographic location ("geolocation") of the capture, time/date of capture, thumbnail images, previous versions of the image, and/or other possible metadata. In some implementations, one or more of the images may be references (e.g. URLs) to images stored external to the data store 112.

The correction history 133 includes a history of each user's actions associated with the corrections undertaken by the image correction service 121. For example, the correction history 133 may include identifiers of the images in which a user specified a blemish, the area(s) of the image(s) specified by the user as containing the blemish, any changes by the user made during the automatic correction operations, acceptance and/or rejection by the user of the automatically corrected images, a history of the changes made to the images, and/or other possible historical data.

The user data 135 includes various data associated with users of the image correction service 121 and/or who have images stored in the image library 131. The user data 135 may include user credentials, identifiers of images stored by the user, identifiers of images in which the user appears, preferences, and/or other possible data.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 161. The display 161 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 106 may be configured to execute various applications such as a client application 163 and/or other applications. The client application 163 may be executed in a client 106, for example, to access network content served up by the computing environment 103 and/or other servers, thereby rendering a user interface 165 on the display 161. To this end, the client application 106 may comprise, for example, a browser, a dedicated application, etc., and the user interface 165 may comprise a network content page, an application screen, etc. The client 106 may be configured to execute applications beyond the client application 163 such as, for example, email applications, social networking applications, word processors, spreadsheets, and/or other applications.

Next, a general description of the operation of the various components of the networked environment 100 is provided. To begin, a user operating the client 106 employs the client application 163 to establish a communication session with the image correction service 121. The communication session may be carried out using various protocols such as, for example, hypertext transfer protocol (HTTP), simple object access protocol (SOAP), representational state transfer (REST), user datagram protocol (UDP), transmission control protocol (TCP), and/or other protocols for communicating data over the network 109. In some implementations, the user is authenticated to the image correction service 121 using one or more user credentials.

Figure 2:
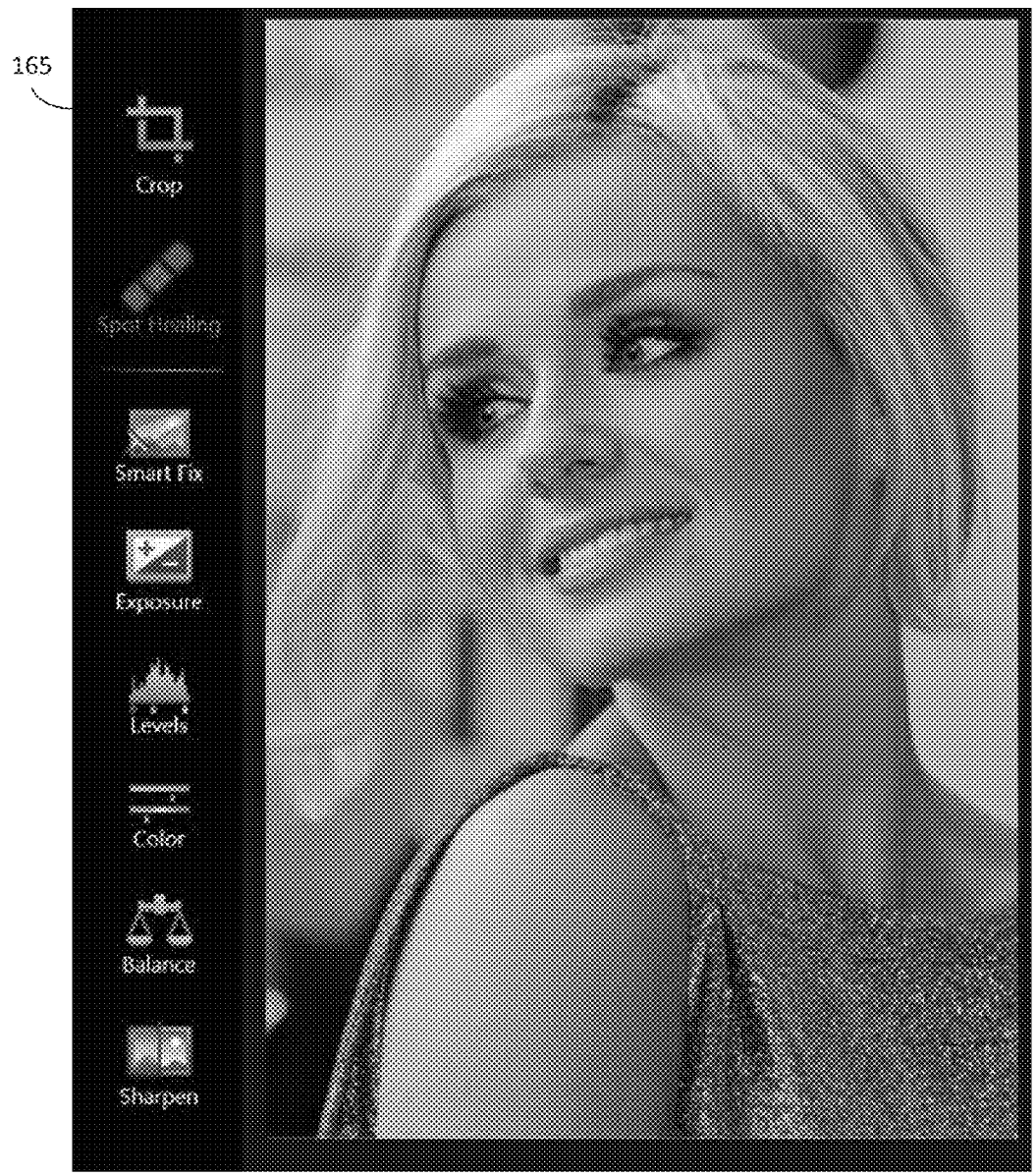
FIGS. 2-4 are pictorial diagrams of an example user interface rendered by a client in the networked environment of FIG. 1 according to various embodiments of the present disclosure.
Figure 3:
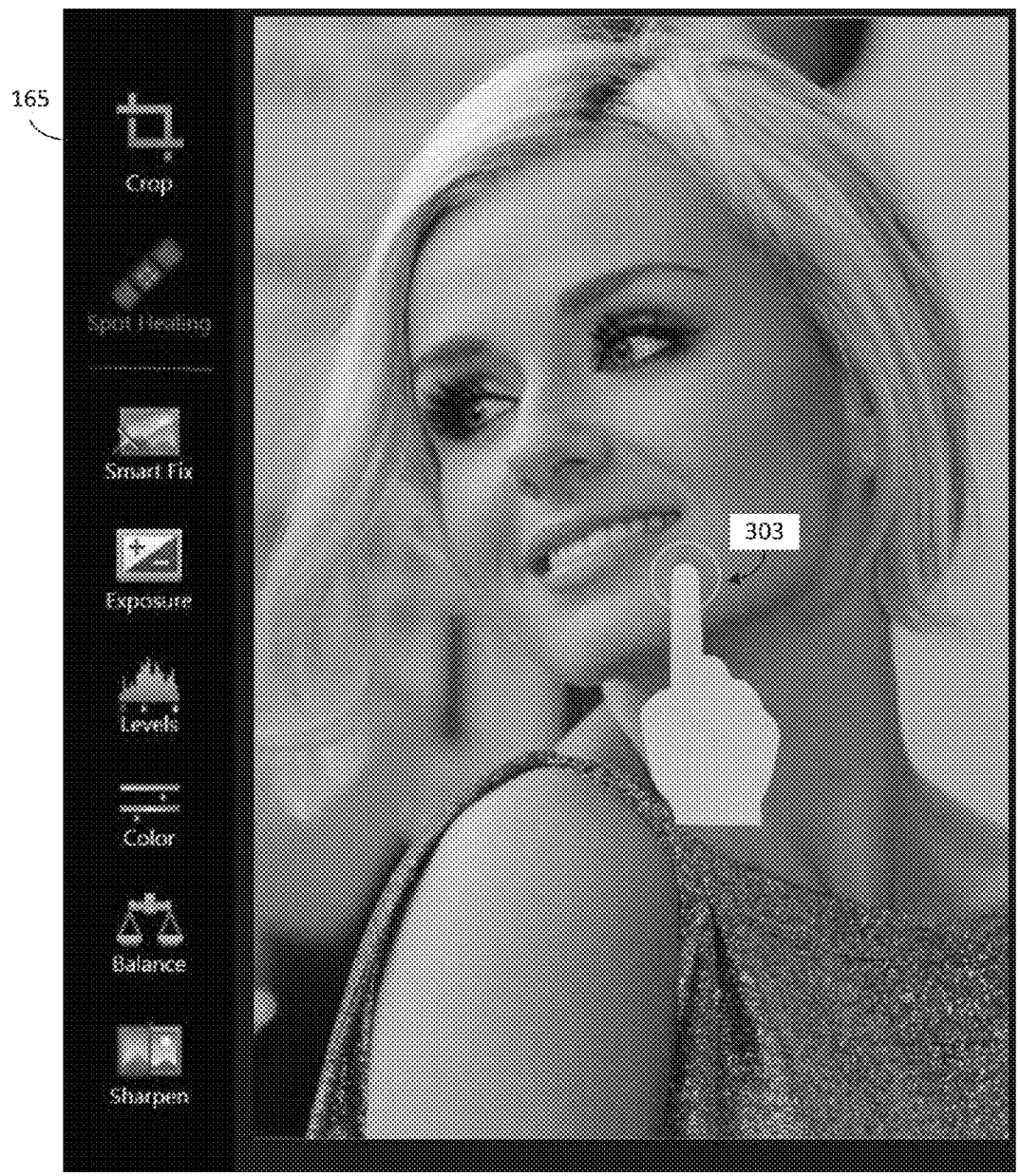

Thereafter, the user selects, from the user interface 165, an image having a blemish to be corrected, such as shown in FIG. 2. In some embodiments, the selected image may be chosen from the preexisting images from the image library 131 that are associated with the user, uploaded from the client 106 through the user interface 165, and/or obtained from other possible sources. As illustrated in FIG. 3, once the image is selected, the user then selects an area 303 of the image that contains the blemish that is sought to be corrected, such as an area of a face that contains a scar. In some embodiments, the area selected by the user may be all or a significant portion of the image.

The image correction service 121 determines the spot pattern for the blemish in the area 303 using a noise detection algorithm and/or other possible techniques. For example, using a noise detection algorithm in conjunction with an auto-highlighting algorithm, a spot pattern of a blemish can be identified within the user-defined area based on differences in the noise characteristics of the blemish from other regions of the area. The noise characteristics can be identified based upon the degree of variation in saturation, contrast, brightness, etc. in the user-defined area of the image.

In addition, the image correction service 121 determines the context pattern for the region of the image in which the blemish appears. For example, in FIG. 3, the spot pattern is the scar and the context pattern is the face in which the scar appears. The context pattern may be identified using face detection algorithms, edge detection algorithms, and/or similar operations as can be appreciated. For example, using an edge detection algorithm, the context pattern may be identified based on the arrangement of "edges" in a region of the image where the spot pattern is located. An edge can be identified based upon the organization of points in the image at which image brightness has a discontinuity. Although this particular example in FIG. 3 illustrates detection of a scar on the face of a person, detection of other types of blemishes in other types of contexts are also possible, examples of which are discussed later in the present disclosure.

Subsequently, the image correction service 121 may preview the corrected image to the user in order to confirm that the correction operations are performed as expected. In some implementations, the preview may allow the user to edit the spot pattern of the blemish to be corrected, edit the corrections made to the spot pattern, and/or other possibilities. The spot pattern correction may be carried out using various algorithms, such as Content-Aware Fill technology in Adobe® Photoshop® available from Adobe Systems, Inc. of San Jose, Calif., which will determine a replacement for a selected area of an image based on the surrounding area of the image.

Once the user confirms the corrections made to the selected image, image correction service 121 may store the spot pattern and context pattern of the image, as well as any changes made by the user, to the correction history 133. The corrected image is stored to the image library 131, to the client 106, and/or to other possible locations.

Subsequently, the image correction service 121 prompts the user to determine if other images should be examined in order to identify and correct similar spot patterns (i.e. similar blemishes) appearing within the other images that have similar context patterns. If the user chooses to examine the other images, the image correction service 121 may begin examining the other images associated with the user that are specified in the image library 131. For example, other images that the user may have stored in the image library 131 and elsewhere will be examined in order to find a similar context pattern (e.g. a similar face) having a similar spot pattern (e.g. facial scar).

In some embodiments, the examination of other images may be carried out in an order based on the temporal context, geographic location context, and/or other characteristics of the original selected image. For example, if the image the user originally selected to correct was captured on Jan. 1, 2014, the image correction service 121 may begin examining other images of a proximate capture time and date to the original image based on the presumption that images from a similar time are more likely to exhibit a similar blemish. Likewise, the image correction service 121 may begin examining other images of a proximate geographic location to the original image based on the presumption that images from a similar location are more likely to exhibit a similar blemish.

Figure 4:

As shown in FIG. 4, the user interface 165 for the image correction service 121 then presents other images 401a-c found to have a spot pattern 405 within a context pattern similar to the corresponding spot pattern and context pattern of the originally selected image. Similarity of the patterns can be determined based upon pattern shapes such as can be performed by face matching algorithms and/or other object matching techniques as can be appreciated. For these detected images 401a-c, the image correction service 121 may preview corrections to those images in order to confirm that the correction operations are performed as desired. The corrections made by the image correction service 121 to each of these detected images 401a-c may be tailored based on the correction history 133, which captured changes made by the user to the past automatic corrections of other images. These past changes made by the user may include, for example, changes to the area of the spot pattern, changes to the fill applied to the spot pattern, etc. In addition, the preview may allow the user to further adjust characteristics of the correction applied to each of these images 401 a-c detected by the image correction service 121.

Once the user confirms the corrections made to the detected images 401a-c, the image correction service 121 may store the similar spot patterns and similar context patterns of the these images 401a-c, as well as any changes made by the user, to the correction history 133. The corrected images may then be stored to the image library 131, to the client 106, and/or to other possible locations.

In some embodiments, images subsequently added by the user to the image library 131 may be examined in order to detect similar spot patterns and context patterns to images for which a correction has been previously applied. In the event similar spot patterns and context patterns are detected, the image correction service 121 may prompt the user to determine if the newly added image should be corrected as well. For example, the image correction service 121 may have previously corrected various images then existing in the image library 131 of a particular person having a scar on her face. If, at a later time, the user transfers an additional image of the person to the image library 131, the image correction service 121 can recognize their face in the image and examine it to determine if the scar is present in the new image. If it is present, the image correction service 121 may prompt the user to correct this new image as had been previously done for other images of the person. Similarly, a new image may be examined at the time the image is captured, for example, by a smart phone camera using a local or remotely-accessed image correction service.

Throughout FIGS. 2-4, an illustrative example of correcting a blemish on a face has been used to describe the operation of the image correction service 121. However, as can be appreciated, correcting of other objects or blemishes that may be present in different areas of an image (i.e. other than a face) are also possible.

Figure 5:
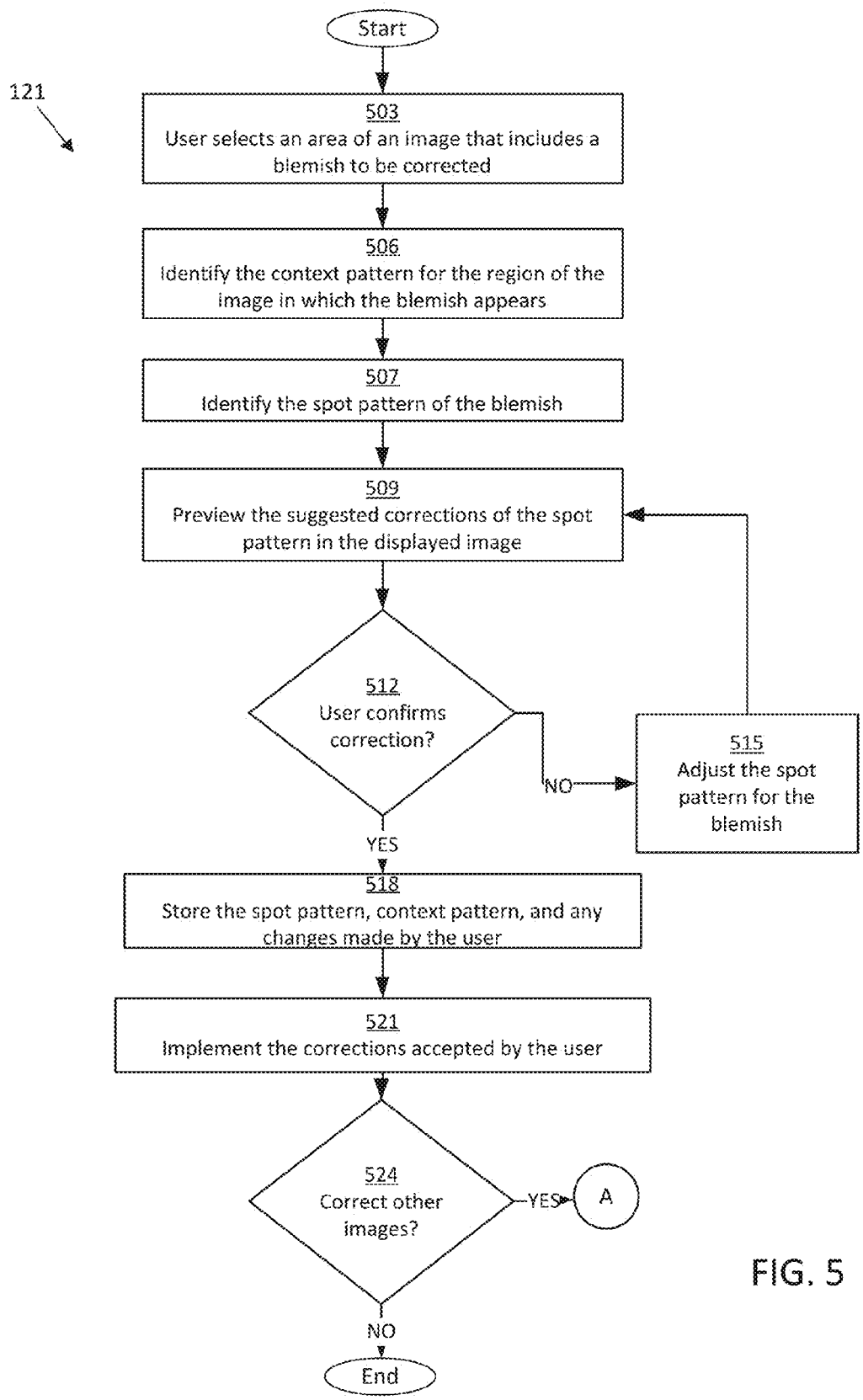
FIG. 5 is a flowchart illustrating one example of functionality implemented as portions of image correction service executed in a computing environment in the networked environment of FIG. 1 according to various embodiments of the present disclosure.

Referring next to FIG. 5, shown is a flowchart that provides one example of the operation of a portion of the image correction service 121 according to various embodiments. It is understood that the flowchart of FIG. 5 provides merely an example of the many different types of functional arrangements that may be employed to implement the operation of the portion of the image correction service 121 as described herein. As an alternative, the flowchart of FIG. 5 may be viewed as depicting an example of elements of a method implemented in the computing environment 103 according to one or more embodiments. The steps depicted in the flowchart of FIG. 5 may be implemented once a user has been authenticated to the image correction service 121 and has selected an image to which a correction should be applied to a blemish.

Figure 6:
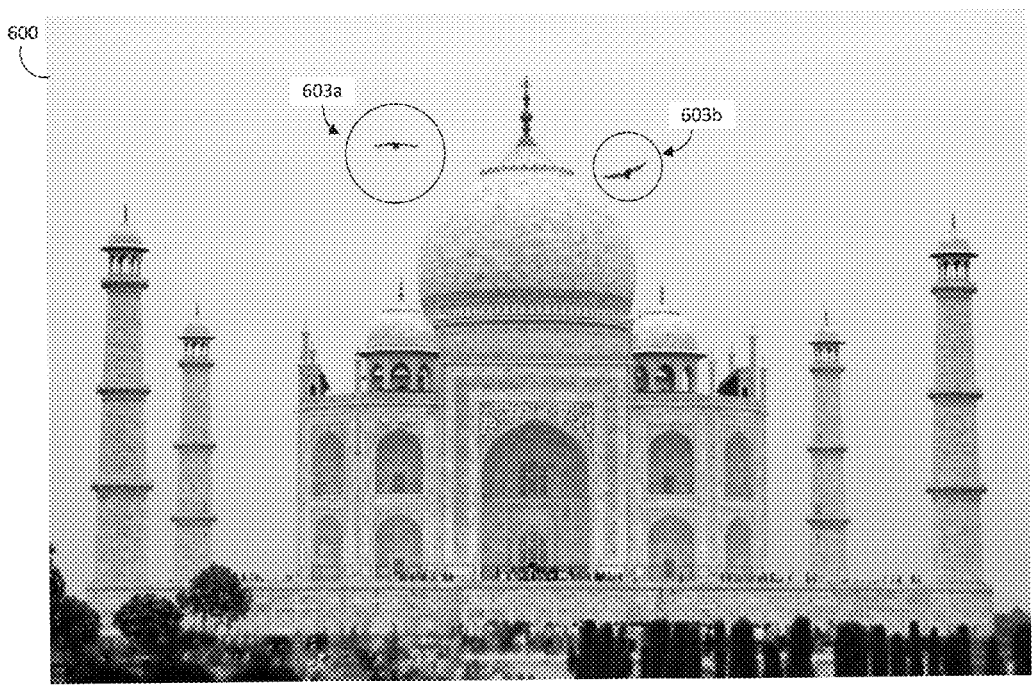
FIGS. 6 and 7 are pictorial diagrams of images that may be examined by the image correction service executed in a computing environment in the networked environment of FIG. 1 according to various embodiments of the present disclosure.

Beginning with block 503, the user then selects one or more areas of the image containing a blemish that is sought to be corrected. For example, in FIG. 6, the areas 603a-b were selected by the user that capture portions of the image 600 of the Taj Mahal that include birds which the user wishes to remove from the image (i.e. blemishes). Next, in block 506 of FIG. 5, the image correction service 121 determines the context pattern for the region of the image 600 in which the blemish appears. The context pattern may be identified using edge detection algorithms, face detection algorithms, and/or similar operations as can be appreciated. In an embodiment, the context pattern may be automatically identified as an area surrounding the blemish within a predetermined radius or bounding area of a fixed size. The size of the context pattern may be based on the size of the user-selected blemish area. For example, the context area may be a circle, oval, or square having double, triple, etc. the size of the user-selected blemish area and may be centered on the center of the user-selected blemish area.

In some embodiments, the image correction service 121 may determine that a multilevel context pattern should be used for a given image. The determination that a multilevel context pattern is needed can be based upon an edge detection algorithm determining that a threshold number of edges are present in the original image (i.e. having too many edges), a user preference defined in the user data 135, and/or other possible criteria as can be appreciated. By identifying various component context patterns for the image that include one or more of the areas selected by the user, the image correction service 121 can improve the likelihood of finding other images with a similar context pattern to at least one of the component context patterns.

Figure 7:
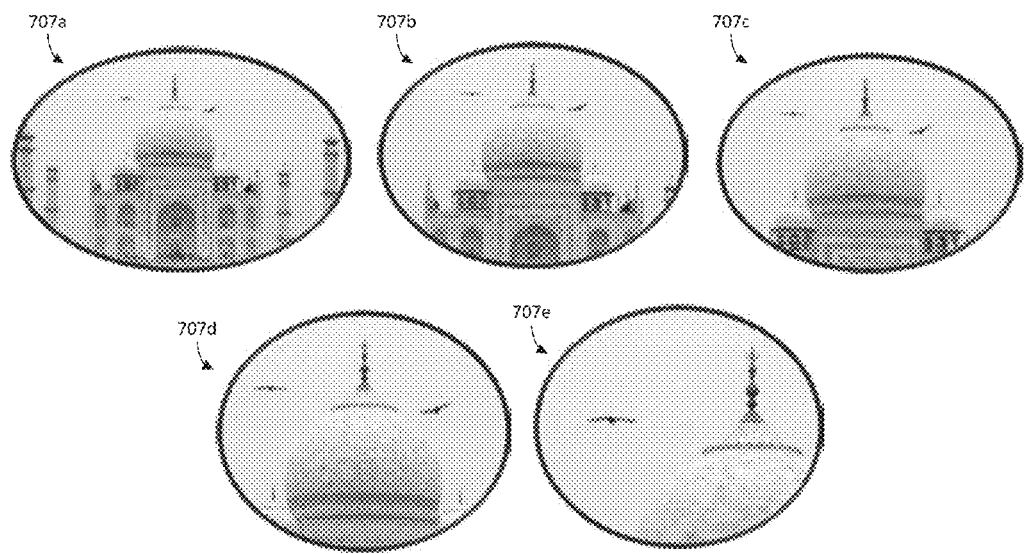

For example, returning to FIG. 6, if the context pattern used is as large as the captured image of the Taj Mahal itself, then it is likely that only other images of the Taj Mahal from the same perspective would be considered to have a similar context pattern, thus resulting in automatic correction of few other images. Therefore, the image correction service 121 may generate a multilevel context pattern from the image 600 such as shown in FIG. 7. In FIG. 7, the exemplary component context patterns 707a-e of the multilevel context pattern are shown representing various views derived from the original image 600 that each capture one or more of the areas 603a-b identified by the user. The number of component context patterns created from an image can depend upon the number of areas identified by the user, the number of edges present in each of the component context patterns, a user preference defined in the user data 135, and/or other possible criteria as can be appreciated.

Each of the views of the component context patterns 707a-e may be a different cropped region from the image 600 that capture some or all of the areas 603a-b, while also capturing different portions of the context of the image 600 in which these captured areas appear. Continuing the example, the component context pattern 707a is a full shot of the monument in the image 600 that also includes all of the birds (i.e. the blemishes) in the image, the component context pattern 707d is a cropped and enlarged subsection of the image 600 that includes all of the birds along with the dome portion of the monument, the component context pattern 707e is a different cropped and enlarged subsection of the image that includes only one of the birds along with another part of the dome of the monument, etc. By identifying various component context patterns 707a-e for the image 600 that include one or more of the areas 603a-b selected by the user, the image correction service 121 can improve the likelihood of finding other images with a similar context pattern to at least one of the various component context patterns 707a-e, as opposed to a single context pattern.

Then, in block 507 of FIG. 5, image correction service 121 determines the spot pattern for the blemish in the area selected by the user, such as the area 603a-b, using a noise detection algorithm or other possible techniques.

Subsequently, in block 509, the image correction service 121 may preview the corrected image to the user in order to allow the user to confirm that the correction operations are performed as expected.

Next, in block 512, the image correction service 121 determines whether the user accepts or confirms the corrections made to the image.

If the user seeks to make corrections, in block 515, the image correction service 121 may allow the user to edit the spot pattern of the blemish to be corrected, edit the corrections made to the spot pattern, and/or other possibilities. Thereafter, execution of the image correction service 121 returns to block 509. Alternatively, if the user confirms the corrections made to the image, in block 518, the image correction service 121 may store the spot pattern and context pattern of the image, including a multilevel context pattern, as well as any changes made by the user, to the correction history 133. Then, in block 521, the image correction service 121 may implement the corrections confirmed by the user and store the corrected image to the image library 131, to the client 106, and/or to other possible locations.

Subsequently, in block 524, the image correction service 121 prompts the user to determine if other images should be examined in order to identify and correct similar spot patterns (i.e. the blemish) appearing within the other images that have similar context patterns. If the user chooses not to search for any additional images to be corrected, then this portion of the execution of the image processing service may end as shown.

Figure 8:
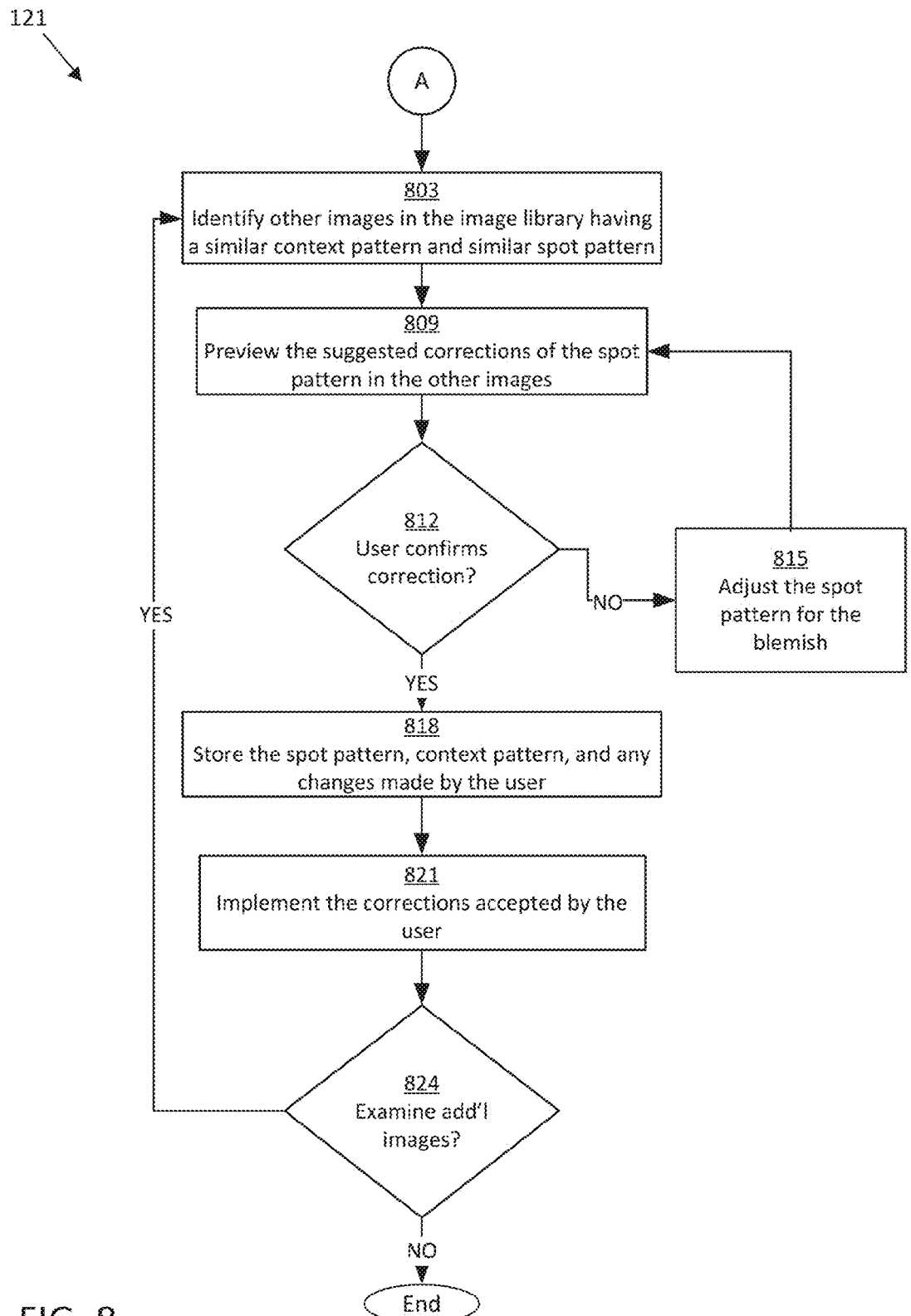
FIG. 8 is a flowchart illustrating another example of functionality implemented as portions of image correction service executed in a computing environment in the networked environment of FIG. 1 according to various embodiments of the present disclosure.

Alternatively, if the user chooses to examine the other images, then the flow chart continues in the flow chart of FIG. 8. Beginning with block 803 in FIG. 8, the image correction service 121 may begin examining the other images associated with the user that are specified in the image library 131 or elsewhere. This may include, for example, other images that the user may have stored in the image library 131, images stored on the client 106, other computing devices accessible via the network 109, and/or other locations as can be appreciated. The available images will be examined in order to find a similar spot pattern (e.g. birds in flight) in a region of the image having a similar context pattern (e.g. resembling one or more of the component context patterns).

In some embodiments, the examination of other images may be carried out based on the temporal context, geographic location context, and/or other characteristics reported in the metadata of the original selected image. For example, if the image the user originally selected to correct was captured on Jan. 1, 2014, the image correction service 121 may begin examining other images of a proximate capture time and date to the original image based on the presumption that images from a similar time are more likely to exhibit a similar blemish. Likewise, the image correction service 121 may begin examining other images of a proximate geographic location to the original image based on the presumption that images from a similar location are more likely to exhibit a similar blemish. Thereafter, the search of images may be expanded to other locations, times, dates, etc., as may be configured by the user.

Then, in block 809, the user interface 165 for the image correction service 121 then presents other images found to have a spot pattern in a region having a context pattern similar to the spot pattern and context pattern of the originally selected image 600. For these detected images, the image correction service 121 may preview corrections to them in order to confirm that the correction operations are performed as expected. The corrections made by the image correction service 121 to each of these detected images may be tailored based on the correction history 133, which captured any changes made by the user to the past automatic corrections of the original image 600 and potentially other images. These past changes made by the user may include, for example, changes to the area of the spot pattern, changes to the fill applied to the spot pattern, etc.

Next, in block 812, the image correction service 121 determines whether the user accepts or confirms the corrections made to the detected images. If the user seeks to make correction, in block 815, the image correction service 121 may allow the user to edit the spot pattern of the blemish to be corrected, edit the corrections made to the spot pattern, remove an image from the set of detected images, and/or other possibilities. Thereafter, execution of the image correction service 121 returns to block 809.

Alternatively, if the user confirms the corrections made to the image, in block 818, the image correction service 121 may store the similar spot patterns and similar context patterns of the detected image, any changes made by the user, metadata associated with the images, and/or other possible data to the correction history 133. Then, in block 821, the image correction service 121 may implement the corrections confirmed by the user and store the corrected images to the image library 131, to the client 106, and/or to other possible locations. Next, in block 824, the image correction service 121 determines whether additional images should be examined for correction. These additional images may include images that will be added to the image library 131 in the future, existing images in the image library 131 that may now be identified based recent corrections performed by the image correction service 121, and/or other possible images. Additional images may be detected and analyzed for blemishes as images are created on or received at a new device, such as a laptop, camera, or smartphone, or when images are added to a collection of images. For example, a social networking website may provide an image analysis function that is applied to all images that a user uploads to the social networking website so that a user does not have to repeatedly delete the same mole from every self image.

Figure 9:
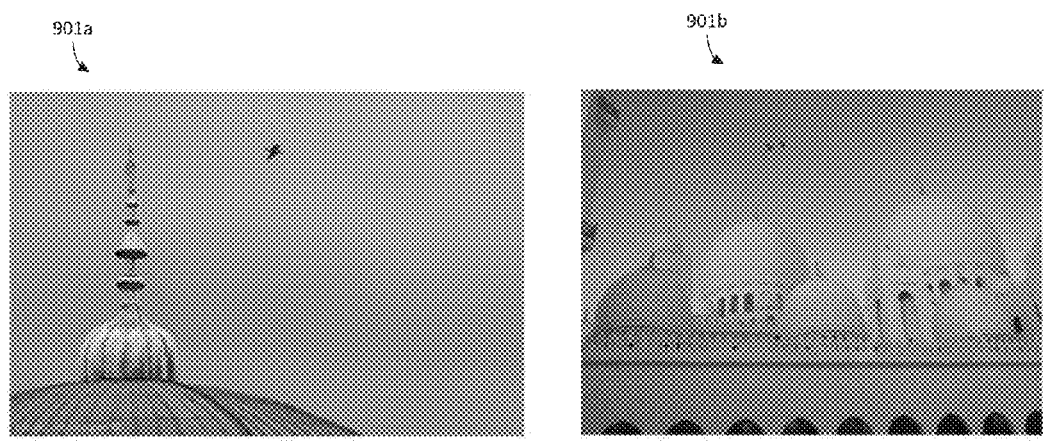
FIG. 9 is a pictorial diagram of images that may be examined by the image correction service executed in a computing environment in the networked environment of FIG. 1 according to various embodiments of the present disclosure.

In FIG. 9, shown are detected images 901a-b that were among other images similarly matching one or more of the component context patterns 707a-e. Using metadata for the detected images 901a-b and the original image 600, the image correction service 121 can determine that, despite the similarity with one or more of the component context patterns, the image capture locations are of different landmarks. However, if corrections were applied to the images 901a-b and confirmed by the user, the image correction service 121 may infer that the spot and context patterns present in the images 901a-b should be added to the existing collection of spot and context pattern sets used to examine other images within the image library 131 or elsewhere. These other images can include images that would not otherwise be a similarity match to one or more of the component context patterns 707a-e, but that are a similarity match to the context patterns present in 901a-b.

Continuing, if the user chooses to examine other images for automatic correction, then execution of the image correction service may return to block 803. Alternatively, if the user chooses not to examine additional images, this portion of the execution of the image correction service 121 ends as shown.

Figure 10:
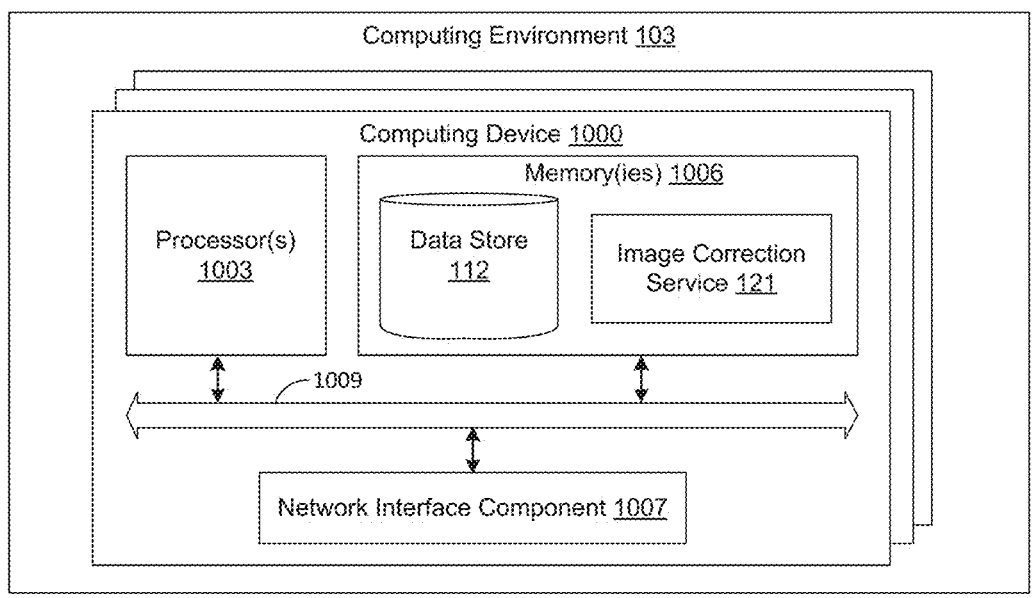
FIG. 10 is a schematic block diagram that provides one example illustration of a computing environment employed in the networked environment of FIG. 1 according to various embodiments of the present disclosure.

With reference to FIG. 10, shown is a schematic block diagram of the computing environment 103 according to an embodiment of the present disclosure. The computing environment 103 includes one or more computing devices 1000. Each computing device 1000 includes at least one processor circuit, for example, having a processor 1003, a memory 1006, and a network interface 1007, all of which are coupled to a local interface 1009. To this end, each computing device 1000 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 is the image correction service 121, and potentially other applications. Also stored in the memory 1006 may be a data store 112 and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript , Perl, PHP, Visual Basic®, Python®, Ruby, Flash®, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the image correction service 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 8 show the functionality and operation of an implementation of portions of the image correction service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 5 and 8 show a specific order of execution, it is understood that the order of execution may differ from that which is depicted. For example, the order of execution of two or more blocks may be scrambled relative to the order shown. Also, two or more blocks shown in succession in FIGS. 5 and 8 may be executed concurrently or with partial concurrence. Further, in some embodiments, one or more of the blocks shown in FIGS. 5 and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the image correction service 121, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the image correction service 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1000, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
   a computing device:
      receiving input selecting an area of an image that includes a blemish to be corrected;
      identifying a context pattern comprising a region of the image representing a context in which the blemish occurs in the image;
      identifying a spot pattern of the blemish within the area;
      correcting the spot pattern of the blemish within the image;
      identifying related images having context patterns similar to the context pattern of the image; and
      correcting similar instances of the spot pattern appearing within the related images.

2. The method of claim 1, wherein a user confirms said correcting within the image.

3. The method of claim 1, further comprising a user interface through which the computing device receives the input selecting the area of the image that includes the blemish.

4. The method of claim 1, further comprising:
   storing at least the spot pattern and the context pattern of the image in a correction history; and
   automatically examining newly added images for blemish correction based at least in part upon the correction history.

5. The method of claim 1, wherein the related images are specified in an image library.

6. The method of claim 1, wherein the related images are examined in an order based upon a date of capture of the respective images, beginning with ones of the related images captured nearest in time to the image.

7. The method of claim 1, wherein the context pattern of the image is a multilevel context pattern and the context patterns of the related images are similar to at least one component context pattern of the multilevel context pattern.

8. The method of claim 1, further comprising:
   identifying a collection of other images having context patterns similar to at least one of the context patterns of the related images; and
   based at least in part upon on a confirmation by the user, correcting similar instances of the spot pattern appearing within the collection of other images.

9. The method of claim 1, wherein the spot pattern is identified using an noise detection algorithm.

10. The method of claim 1, wherein said correcting instances of the spot pattern appearing within the collection of related images is performed after the user confirms a preview of said correcting in the collection of related images.

11. The method of claim 1, wherein the spot pattern is corrected using content-aware fill technology.

12. A non-transitory computer-readable medium embodying a program executable in at least one computing device, comprising code that:
   receives input, from a user, selecting an area of a displayed image, wherein the area includes the blemish sought to be corrected by the user;
   identifies a spot pattern of the blemish to be corrected within the area and a context pattern of the displayed image, wherein said identified spot pattern is editable by the user;
   corrects the spot pattern of the blemish within the displayed image, wherein the user confirms said correcting within the displayed image;
   identifies a collection of related images from the image library having context patterns similar to the context pattern of the displayed image; and
   based at least in part upon on said confirmation and any said edit by the user, automatically corrects similar instances of the spot pattern appearing within the collection of related images.

13. The non-transitory computer-readable medium of claim 12, wherein the context pattern is detected using an edge detection algorithm.

14. The non-transitory computer-readable medium of claim 12, wherein the program further comprises code that:
   identifies a collection of other images from the image library having context patterns similar to at least one of the context patterns of the related images; and
   based at least in part upon on said confirmation and any said edit by the user, corrects similar instances of the spot pattern appearing within the collection of other images.

15. The non-transitory computer-readable medium of claim 12, wherein the images in the image library are examined for related images in an order based upon a capture location of the respective images, beginning with ones of the images captured nearest in location to the displayed image.

16. The non-transitory computer-readable medium of claim 12, wherein the program further comprises code that:
   stores at least the spot pattern and the context pattern of the displayed image in a correction history; and
   automatically examines images newly added to the image library for blemish correction based at least in part upon the correction history.

17. A system, comprising:
   at least one computing device; and
   an image correction service executed in the at least one computing device, the image correction service comprising logic that:
      receives input, from a user, selecting an area of a displayed image, wherein the area includes the blemish sought to be corrected by the user;
      identifies a spot pattern of the blemish to be corrected within the area and a context pattern of the displayed image, wherein said identified spot pattern is editable by the user;
      corrects the spot pattern of the blemish within the displayed image, wherein the user confirms said correcting within the displayed image;
      identifies a collection of related images from the image library having context patterns similar to the context pattern of the displayed image; and
      based at least in part upon on said confirmation and any said edit by the user, automatically corrects similar instances of the spot pattern appearing within the collection of related images.

18. The system of claim 17, wherein the image correction service further comprises logic that:
   identifies a collection of other images from the image library having context patterns similar to at least one of the context patterns of the related images; and
   based at least in part upon on said confirmation and any said edit by the user, corrects similar instances of the spot pattern appearing within the collection of other images.

19. The system of claim 17, wherein the image correction service further comprises logic that:
   stores at least the spot pattern and the context pattern of the displayed image in a correction history; and
   automatically examines images newly added to the image library for blemish correction based at least in part upon the correction history.

20. The system of claim 17, wherein the context pattern of the displayed image is a multilevel context pattern and the context patterns of the related images are similar to at least one component context pattern of the multilevel context pattern.

* * * * *